United States Patent Office 3,583,012
Patented June 8, 1971

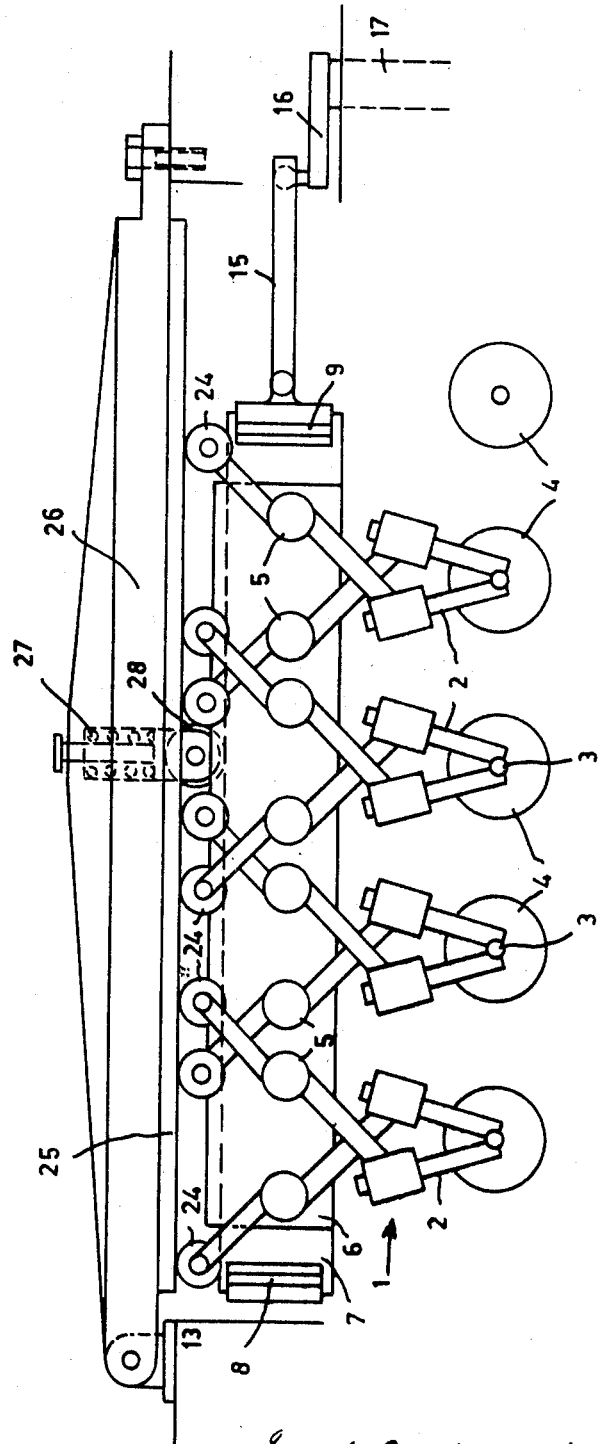

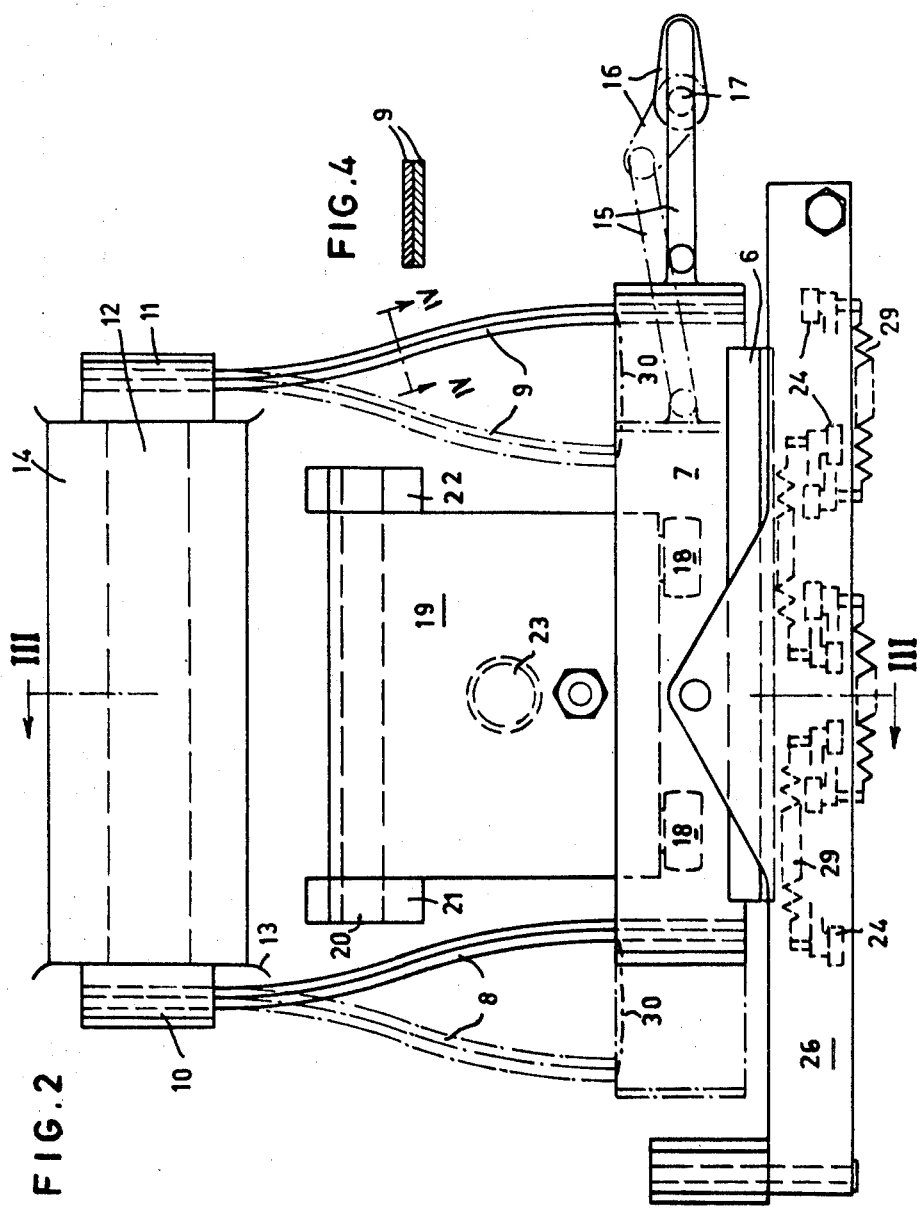

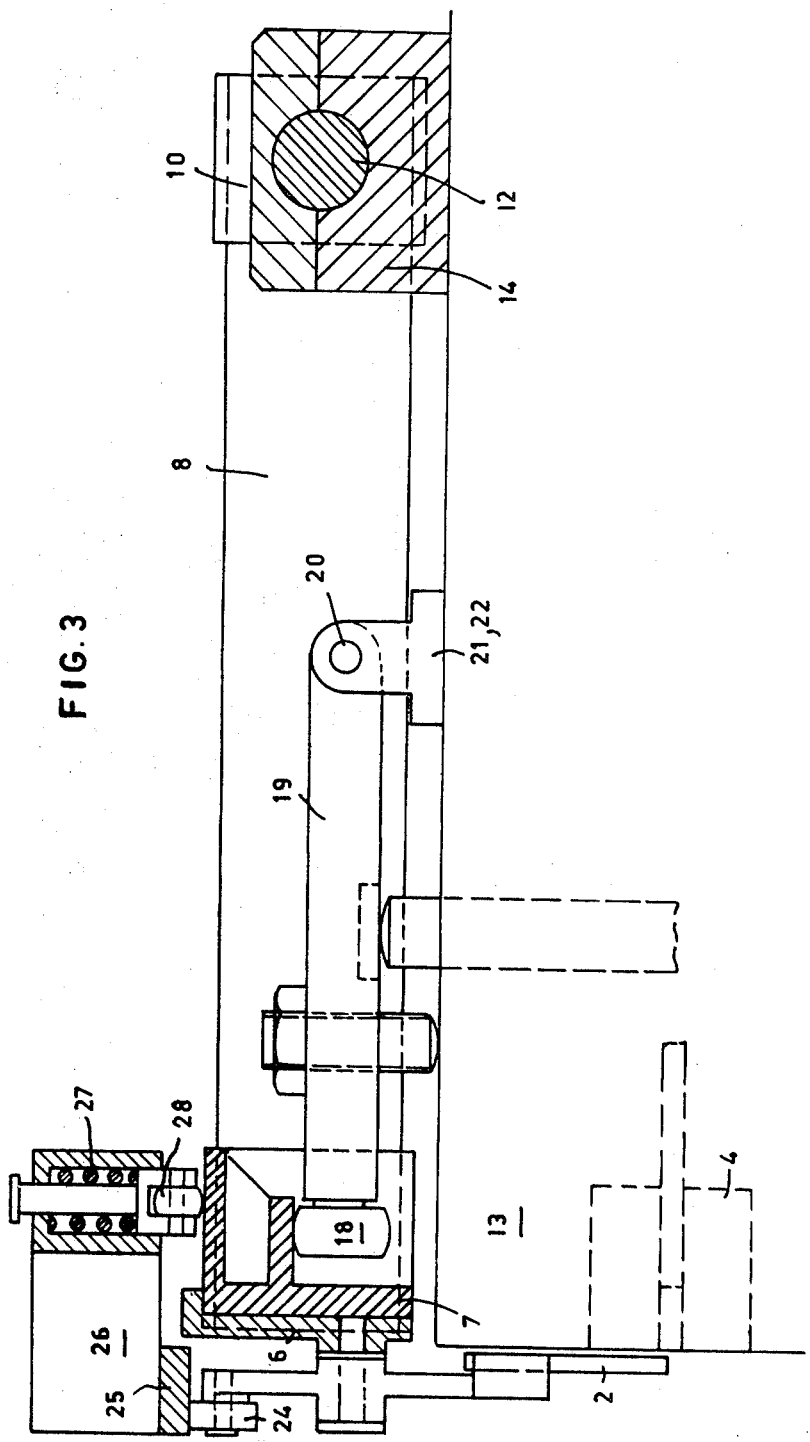

3,583,012
MACHINE FOR MANUFACTURING BOLTS, NUTS AND THE LIKE ARTICLES
Gerardus Cornelis van de Meerendonk, Helmond, Netherlands, assignor to Nedschroef Octrooi Maatschappij N.V., Helmond, Netherlands
Filed Oct. 17, 1968, Ser. No. 768,359
Claims priority, application Netherlands, Oct. 23, 1967, 6714359
Int. Cl. B21k 1/44, 1/64; B32g 9/00; B21d 53/24
U.S. Cl. 10—12.5       9 Claims

ABSTRACT OF THE DISCLOSURE

The machine described comprises a reciprocable carrier member for moving workpiece gripping mechanism along a series of dies wherein the carrier member is suspended and guided by a pair of spaced, long, wide plate or leaf spring levers, the spring levers being arranged in parallel and in position to act in unison to slow down or brake the movement of the carrier member as it approaches either of its extreme positions and to accelerate the movement, or overcome the inertia of the carrier as it leaves its extreme positions. In this construction the carrier member is movable freely on rollers and without bearings or sliding surfaces.

CROSS-REFERENCES TO RELATED APPLICATIONS

The present invention relates to improvements in machines for making bolts, nuts and other similar articles from workpieces and more particularly to an improved transfer mechanism. The present application corresponds to the applicant's Netherlands application No. 6714359, filed Oct. 23, 1967, and the invention of this application constitutes an improvement in transfer mechanisms for machines of the type referred to above, particularly improvements in the transfer carrier and its mounting and operating mechanisms as disclosed in the applicant's Netherlands application No. 294,177 or his corresponding pending U.S. application Ser. No. 557,679, now abandoned.

BACKGROUND OF THE INVENTION (1) Field of the invention

The invention relates to improvements in machines for manufacturing bolt, nut and the like blanks from workpieces, and more particularly to improvements in mechanisms for transferring workpieces being processed in a series of dies or die matrices. In these machines a die block or frame carries the series of dies and a reciprocating tool carrier is moved back and forth for bringing tools into contact with the workpieces and forming blanks in the die cavities.

(2) Description of the prior art

Known machines of the type referred to include transfer mechanisms for progressively transferring workpieces through a series of stations, such mechanisms including sets of gripping means comprised of two armed levers pivoted about axes and biased by springs arranged to cause pairs of the gripping means to grip the workpieces. In such machines the gripping means are provided on a carrier which reciprocates over a distance equal to the distance between the axes of two successive die stations. The upper ends of the pairs of pivoted gripping members are provided with rollers which cooperate with a guiding rail for movement during the reciprocation of the carrier.

In such a known machine, the carrier in the form of a slide is mounted in and guided in a support with upper and lower slide tracks engaged by the slide carrying the gripping mechanism. In this construction, there is considerable loss by friction and wear, particularly in high speed machines of the type under consideration. Because of this wear the guiding means for the slide show much backlash, so that it is difficult to position the workpieces accurately at the entrances to the dies. This leads to difficulties during the movement of the workpieces because a misplaced workpiece invariably causes a shut down of the machine and an interruption of normal production.

Another disadvantage in known constructions is that the slide must be of considerable weight, which in most cases is too great to be reciprocated at the high speed desirable. In these constructions where the slide is of considerable weight, the inertia at the beginning of movement and the momentum at the end of movement must be taken into account and the speed kept down accordingly.

SUMMARY OF THE INVENTION

In accordance with the present invention, the above-mentioned disadvantages are overcome by providing a freely movable carrier member, for the gripping mechanisms, suspended on the projecting end portion of a lever unit, the opposite end of which is mounted on the frame of the machine. In this construction the carrier member is set for "friction-free" reciprocating movement between upper and lower guide rollers by the aid and action of spring means which overcome the inertia of the carrier member at the beginning of its movement and to brake the end portion of the movement of the carrier member as it approaches the extreme limit of its movement.

According to the preferred embodiment of the invention, the lever unit comprises spaced levers of wide plate or leaf spring suspending the carrier member, each having an end attached to the carrier member and their opposite ends fixed to a rotatable shaft carried on the frame of the machine in parallel relation to the carrier member. The fixed ends are held so that the springs flex with movement of the carrier.

Some of the important advantages of the novel construction are the following.

(1) Since the reciprocable member is suspended quite freely there is no friction at all and little moving forces are required.

(2) Since the reciprocable member has no bearings, there are no bearing surfaces liable to wear.

(3) The weight of the carrier structure is small so that the reciprocating masses are also small. There is no necessity to limit the number of strokes of the machine.

(4) The structure is completely free of backlash. The transfer fingers, therefore, will always arrive at the same position in front of the dies. There are no inserting difficulties.

(5) By the application of the plate springs the starting force of the reciprocation stroke is provided by said springs. The springs also provide a braking force at the end portion of said stroke. Therefore, the reciprocable carrier member can make an increased number of strokes per minute.

(6) The reciprocating member, during its reciprocation, moves in and out relative to the dies, so that it is possible to arrange the grippers closely in front of the dies, which is important if short workpieces are to be made.

BRIEF DESCRIPTION OF THE DRAWINGS

The improved machine of the present invention includes other features and advantages, as described more in detail hereinafter in connection with a single embodiment thereof illustrated diagrammatically in the accompanying drawings, in which:

FIG. 1 is a broken front elevational view looking toward the transfer mechanism and the face of the die block or frame of the machine, showing the pairs of gripping fingers in closed gripping position with the reciprocable carrier member in its extreme left-hand position;

FIG. 2 is a plan view of the improved machine shown in FIG. 1. The full line position shows the carrier member and associated elements in the extreme right-hand position. The dotted line position is that shown in FIG. 1;

FIG. 3 is a broken vertical sectional view taken on the line 3—3 of FIG. 2; and

FIG. 4 is a cross-sectional view of one of the plate or leaf springs taken on the line IV—IV of FIG. 2.

Referring to the drawings, the workpiece transfer mechanism comprises a series of four workpiece gripping means 1, each comprising a pair of gripping fingers 2, which grip and carry workpieces 3 to and from the die cavities, one of which is illustrated in dotted lines in FIG. 3. The gripping means 1 are mounted on pivots 5 attached to a plate 6 adjustably fixed to a carrier member 7. The carrier member 7 is F-shaped in cross-section (FIG. 3) and is suspended between the projecting ends of two spaced plate springs 8 and 9. The opposite ends of these springs are secured in spaced relation respectively to the enlarged ends 10 and 11 of a shaft 12 pivotally mounted in a bearing block 14 fixed to the frame 13 of the machine.

The reciprocable carrier member 7 is connected by an arm 15 to a crank 16 driven by a crankshaft 17. The movement of the carrier member 7 from one position to the other is controlled by the crank 16 which is correlated with other mechanisms of the machine. However, the plate springs 8 and 9 initiate the starting movement in either direction and overcome momentum of the carrier member 7, or brake its movement, since the springs are bent and in tension at the beginning of each stroke and being bent during the end portion of the stroke. During the reciprocation of the carrier member 7 the ends of the springs 8, 9 attached to the respective ends of the carrier member, each describe an arc 30 as indicated in FIG. 2, so that the carrier member itself moves bodily slightly inwardly and outwardly with respect to the face of the frame 13. However, this is insufficient to adversely affect the operation of the gripping fingers 2, since the springs 8 and 9 are relatively long compared to the amplitude of movement of the carrier member 7. This movement is an advantage for short workpieces.

The F-shaped carrier member 7 is supported on spaced rollers 18 maintained at the correct level, so that the gripping fingers 2 are also maintained at the correct level in front of the dies 4. The rollers 18 are located in spaced relation on the front end of a wide member 19 hinged or pivoted to a shaft 20 mounted in spaced bearings 21, 22 attached to the frame 13. The correct level of the rollers 18 is obtained by the adjusting stud in member 19 and bearing on the frame. The hinged member 19 is subjected to an up and down movement in a known manner by a push rod 23 for effecting the opening and closing of the pairs of fingers 2. During an upward movement of the rollers 18 and the carrier member 7 by the push rod 23, rollers 24 on the ends of the upper arms of the gripping members 1 are pushed against the fixed guide rail 25, so that the pairs of fingers 2 are caused to open.

The guide rail 25 is attached to the underside of a swingable bridge support member 26, attached in turn to the frame in the manner shown.

Also during the upward movement of the carrier member 7, it moves a roller 28 biased by a compression spring 27 which maintains the carrier member 7 in engagement with the guide rollers 18. The compression spring 27 maintains the carrier member 7 in guided frictionless engagement with the rollers 18 and 28 during both upward and downward movement. The upper arms of the gripping fingers 2 are biased by tension springs 29, so that as the carrier 7 and the plate 6 are lowered, the pairs of fingers move to grip workpieces by the action of the springs 29.

During the operation of the improved transfer construction illustrated in the drawings and described above, the relatively long, wide spaced leaf or plate spring units 8, 9 attached to the respective end portions of the carrier member 7 serve to suspend the carrier members and its associated gripping mechanisms, so that it moves freely without any appreciable resistance from the rollers 18, 24 and 28. The plate or leaf springs provide an operation of the carrier member which is entirely free of friction and in which the effect of its weight is almost completely removed by the action of the springs at the end portions of each movement.

Since the remote ends of the springs 8, 9 are rigidly fixed against flexing, the springs per se flex and are put under tension at the end portions of each stroke.

I claim:

1. In a machine for manufacturing bolts, nuts and similar articles of the type including a frame, a series of spaced die stations for shaping and forming said articles, a transfer mechanism for transferring workpieces from one station to the next including an elongated reciprocable carrier member, means for reciprocating the carrier member, and means mounted on said carrier member for engaging and moving workpieces from one station to the next during reciprocation of the carrier member, wherein the improvement comprises means mounted on the frame of the machine and connected to the carrier member for suspending said carrier in substantially free-floating relationship; relative to the frame of the machine, and cooperating substantially friction-free means supporting and guiding the carrier member in a path extending along the series of die stations during its reciprocation, said carrier suspending means acting to initiate and accelerate the movement of said carrier in both directions along said path and brake the movement of said carrier as it guidingly approaches the extreme positions of its travel therealong.

2. A machine as claimed in claim 1, wherein said suspending means includes spring means acting to move said carrier member at the initial part of its stroke movement in both directions and to brake its stroke movement during the final part of its movement in both directions.

3. A machine as claimed in claim 1, wherein said suspending means comprises a pair of spaced levers, respectively connected by an end to the respective end portions of the carrier member.

4. A machine as claimed in claim 3, wherein said levers are of bendable spring material and bendable laterally, and their other end portions are mounted on the frame of the machine and fixed against bending movement.

5. A machine as claimed in claim 3, wherein the levers are elongated plate spring members extending edgewise across the frame of the machine to the carrier member and bendable only in the direction of movement of the carrier member.

6. A machine as claimed in claim 5, including bearing means mounted on the frame of the machine in substantially spaced relation to the carrier member, a shaft mounted in the bearing means parallel to the path of movement of the carrier member and wherein the plate spring members have one end fixed to the respective end portions of the shaft and their other ends fixed to the respective end portions of the carrier member.

7. A machine as claimed in claim 5, wherein each plate spring member comprises two wide spring plates mounted in adjacent face-to-face relation.

8. A machine as claimed in claim 1, wherein the suspending means comprises elongated spring lever means one end of which is connected to the carrier member while its other end is attached to the frame of the machine at a spaced location relative to the carrier member and fixed against lateral movement, said spring lever means being bendable laterally by the reciprocation of the carrier member.

9. A machine as claimed in claim 1, wherein the carrier member is free of slide bearings and the substantially friction-free guiding means comprises spaced rollers supported by the frame of the machine on which the carrier member rolls free during its reciprocation.

References Cited
UNITED STATES PATENTS 1,316,793  9/1919  Hoff ................ 10—12

FOREIGN PATENTS 289,439  3/1965  Netherlands.
294,177  4/1965  Netherlands.

RICHARD J. HERBST, Primary Examiner
E. M. COMBS, Assistant Examiner

U.S. Cl. X.R.
10—72, 76